(12) United States Patent
Ayala (10) Patent No.: US 9,873,329 B2
(45) Date of Patent: Jan. 23, 2018

(54) ELECTRIFIED VEHICLE CONNECTOR

(71) Applicant: FORD GLOBAL TECHNOLOGIES, LLC, Dearborn, MI (US)

(72) Inventor: Carlos Ayala, Novi, MI (US)

(73) Assignee: Ford Global Technologies, LLC, Dearborn, MI (US)

(\*) Notice: Subject to any disclaimer, the term of this patent is extended or adjusted under 35 U.S.C. 154(b) by 288 days.

(21) Appl. No.: 14/697,698

(22) Filed: Apr. 28, 2015

(65) Prior Publication Data
US 2016/0318398 A1 Nov. 3, 2016

(51) Int. Cl.
*B60L 1/00* (2006.01)
*B60L 11/18* (2006.01)
*H01R 27/02* (2006.01)
*H01R 11/28* (2006.01)

(52) U.S. Cl.
CPC ........... *B60L 1/003* (2013.01); *B60L 11/1851* (2013.01); *H01R 11/281* (2013.01); *H01R 27/02* (2013.01); *H01R 2201/26* (2013.01)

(58) Field of Classification Search
CPC .. B60L 1/003; B60L 11/1851; H01R 2201/26; H01R 11/281; H01R 27/02
USPC ........................................................ 307/10.1
See application file for complete search history.

(56) References Cited

U.S. PATENT DOCUMENTS

| 6,672,883 | B2 | 1/2004 | Kasai et al. | |
|---|---|---|---|---|
| 7,594,825 | B2* | 9/2009 | Bielesch | H01R 31/02 439/502 |
| 8,053,669 | B1 | 11/2011 | Sodini et al. | |
| 2004/0203271 | A1* | 10/2004 | Borrego Bel | H01R 13/6666 439/181 |
| 2014/0305696 | A1 | 10/2014 | Tanaka et al. | |
| 2014/0354170 | A1* | 12/2014 | Gredler | H05B 33/0815 315/224 |

FOREIGN PATENT DOCUMENTS

| JP | 2015018616 | 1/2015 |
|---|---|---|
| JP | 2016015809 | 1/2016 |
| JP | 2016022826 | 2/2016 |
| WO | 20120110535 | 8/2012 |

OTHER PUBLICATIONS

Eaton Hybrid Drivetrain System MY09 TRSM2000 EN-US Service Manual, Apr. 2014, pp. 1-138, Eaton Vehicle Group, Kalamazoo, MI.

\* cited by examiner

*Primary Examiner* — Jared Fureman
*Assistant Examiner* — Duc M Pham
(74) *Attorney, Agent, or Firm* — Carlson, Gaskey & Olds, P.C.

(57) ABSTRACT

An exemplary power splitting assembly for an electrified vehicle includes a connector providing at least a portion of a first path and at least a portion of a second path. The first path is to transmit power between a traction battery and a first component. The second path is to transmit power between the traction battery and a second component.

20 Claims, 8 Drawing Sheets

ELECTRIFIED VEHICLE CONNECTOR

TECHNICAL FIELD

This disclosure relates to a power distribution for an electrified vehicle and, more particularly, to a connector of the power distribution system.

BACKGROUND

Generally, electrified vehicles differ from conventional motor vehicles because electrified vehicles are selectively driven using one or more battery-powered electric machines. The electric machines can drive the electrified vehicles instead of, or in addition to, an internal combustion engine. Example electrified vehicles include full hybrid electric vehicles (FHEVs), plug-in hybrid electric vehicles (PHEVs), fuel cell vehicles (FCVs), and battery electric vehicles (BEVs).

Figure 1:
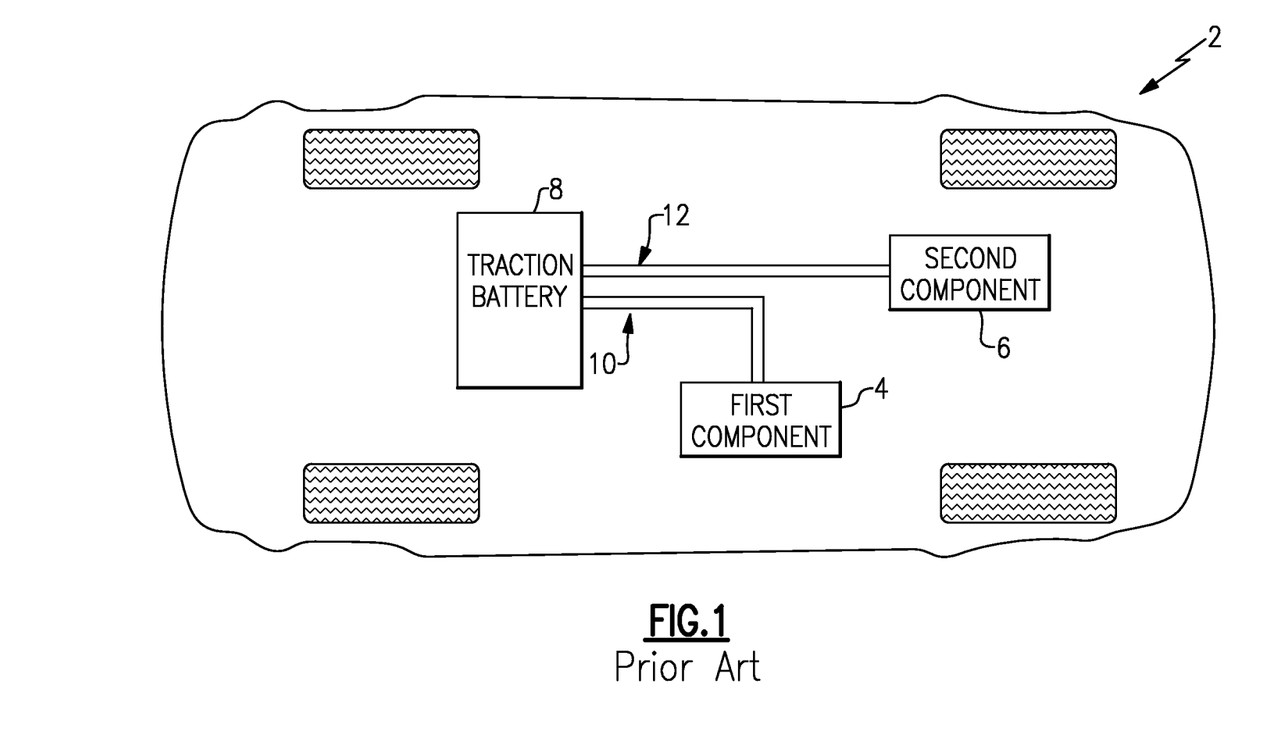
FIG. 1 illustrates an underside of a prior art electrified vehicle.

Referring to FIG. 1, an example prior art electrified vehicle 2 includes a first component 4, a second component 6, and a traction battery 8. At least one first cable 10 extends from the traction battery 8 to the first component 4. The traction battery 8 powers the first component 4 through the first cable 10. At least one second cable 12 extends from the traction battery 8 to the second component 6. The traction battery 8 powers the second component 6 through the second cable 12. Examples of the first component 4 and the second component 6 can include converters, electrical air conditioning systems, heaters, etc.

SUMMARY

A power splitting assembly for an electrified vehicle according to an exemplary aspect of the present disclosure includes, among other things, a connector providing at least a portion of a first path and at least a portion of a second path, the first path to transmit power between a traction battery and a first component, the second path to transmit power between the traction battery and a second component.

In another example of the foregoing assembly, the connector comprises a plug and a jack, The plug is selectively engageable with the jack.

In another example of any of the foregoing assemblies, the jack is directly secured to the first component or the second component.

In another example of any of the foregoing assemblies, the connector comprises a positive splitter providing a portion of both the first path and the second path, and further comprises a negative splitter providing a portion of both the first path and the second path.

In another example of any of the foregoing assemblies, at least one of the positive splitter or the negative splitter is contained within the jack.

In another example of any of the foregoing assemblies, at least one of the positive splitter or the negative splitter is contained within the plug.

In another example of any of the foregoing assemblies, the connector is directly connected to the first component, and further directly connected to at least one cable extending from the traction battery and to at least one cable extending from the second component.

In another example of any of the foregoing assemblies, the connector is configured to transmit power that is equal or greater to 60 volts.

A power distribution system for an electrified vehicle according to another exemplary aspect of the present disclosure includes, among other things, a traction battery, a first component, a second component, and a connector providing at least a portion of an first electrical transmission path extending between the traction battery and the first component, and further providing at least a portion of a second electrical transmission path extending between the traction battery and the second component.

In another example of the foregoing power distribution system, the connector is directly connected to the first component or the second component.

In another example of any of the foregoing power distribution systems, the system includes at least one first cable electrically connecting the connector to the traction battery, and at least one second cable electrically connecting the connector to the second component, wherein the connector is directly connected to the first component.

In another example of any of the foregoing power distribution systems, the connector comprises a plug and a jack. The plug is selectively engageable with the jack.

In another example of any of the foregoing power distribution systems, the first component is an electric converter.

In another example of any of the foregoing power distribution systems, the first component is electric air conditioner for the electrified vehicle.

In another example of any of the foregoing power distribution systems, the first component is a heater.

In another example of any of the foregoing power distribution systems, the first component is a charger.

A method of transmitting power within an electrified vehicle according to yet another exemplary aspect of the present disclosure includes transmitting power along a first electrical transmission path extending from a traction battery, through a connector, to a first component, and transmitting power along a second electrical transmission path extending from the first component, through the connector, to a second component.

In another example of the foregoing method, the power is equal or greater than 60 volts.

In another example of any of the foregoing methods, the connector is directly attached to the first component.

In another example of any of the foregoing methods, the method further includes transmitting power from the traction battery to the connector using at least one first cable, and transmitting power from the connector to the second component using at least one second cable.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates to a power distribution system for an electrified vehicle. The power distribution system incorporates a power splitting assembly to reduce, among other things, cable usage within the electrified vehicle.

Figure 2:
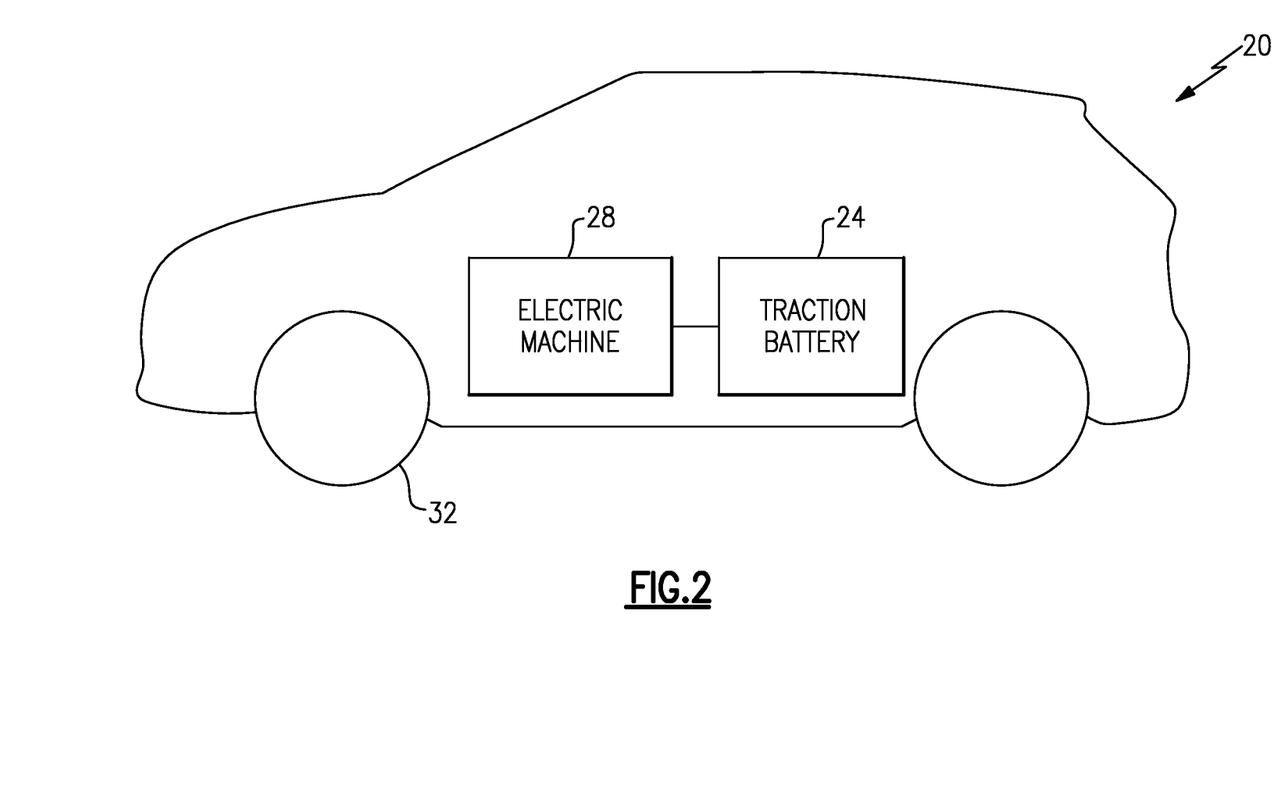
FIG. 2 illustrates a schematic view of an electrified vehicle incorporating an example power distribution system of the present disclosure.

Referring to FIG. 2, an example electrified vehicle 20 includes a traction battery 24, an electric machine 28, and wheels 32. The electric machine 28 receives electric power from the battery 24 and converts the electric power to torque to drive the wheels 32.

The example vehicle 20 is a battery electric vehicle (BEV). In other examples, the vehicle 20 is another type of electrified vehicle, such as a full hybrid electric vehicle (FHEV), which selectively drives wheels using torque provided by an internal combustion engine instead of, or in addition to, the electric machine 28.

The example battery 24 is a relatively high-voltage battery (e.g., 40V-600V). In some examples, the battery 24 is about 60V. As the battery 24 is used for propulsion of the vehicle 20, the battery 24 is considered a traction battery.

Figure 3:
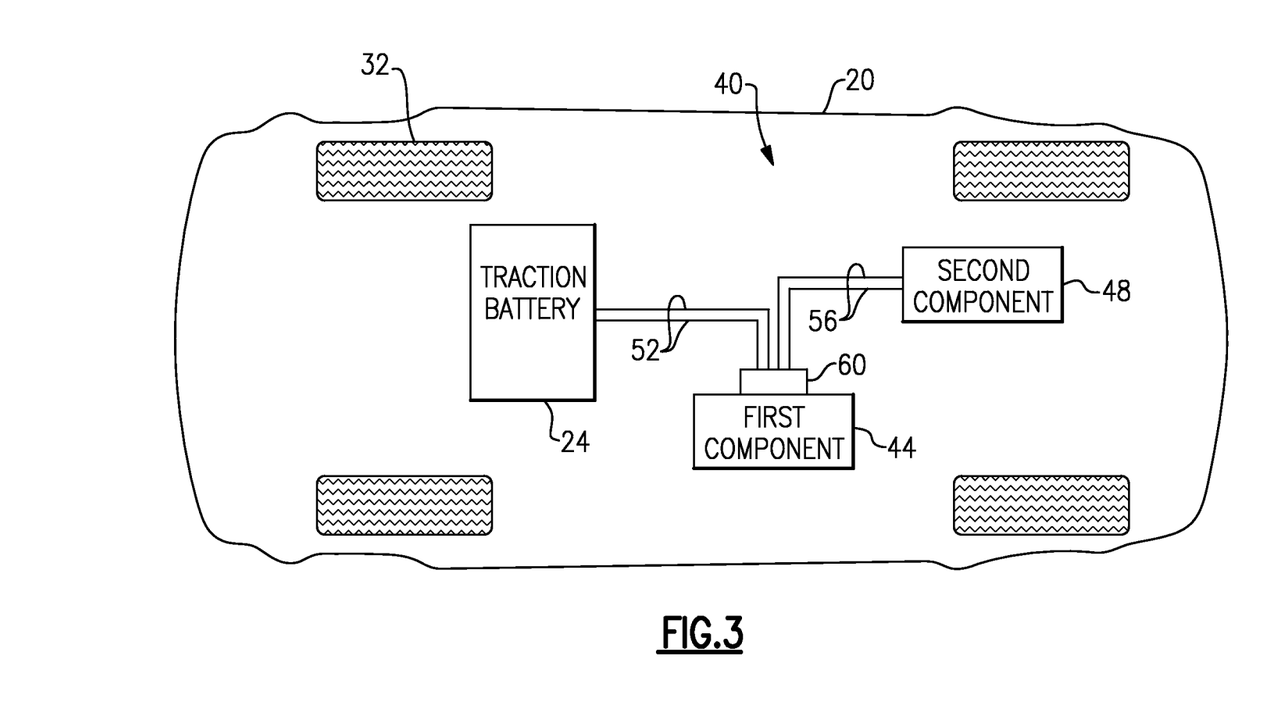
FIG. 3 illustrates an underside of the electrified vehicle of FIG. 2 and shows the power distribution system for the electrified vehicle.

Referring now to FIG. 3 with continuing reference to FIG. 2, the example battery 24 is used in connection with a power distribution system 40 of the vehicle 20. The power distribution system 40 includes, in this example, a first component 44, a second component 48, the battery 24, at least one first cable 52, and at least one second cable 56. The power distribution system 40 additionally includes a connector 60, which, in this example, is directly connected to the first component 44. In another example, the connector 60 is directly connected to the second component 48, or is positioned elsewhere within the vehicle 20.

In some examples, the battery 24 selectively powers the first component 44, the second component 48, or both. Power may be delivered from the battery 24 to the first component 44, the second component 48, or both, regardless whether the battery 24 is powering the electric machine 28 to drive the wheels 32.

The first cable 52 and the second cable 56 are high-voltage cables, which are cables capable of carrying power provided by the battery 24.

The first cable 52 extends from the battery 24 to the connector 60. The second cable 56 extends from the connector 60 to the second component 48. Notably, the second cable 56 is shorter than the second cable 12 of the prior art vehicle 2 (FIG. 1).

The first cable 52 and the connector 60 provide portions of a first electrical transmission path. For example, power from the battery 24 moves through the first cable 52, to the connector 60, and then to the first component 44. If the first component 44 can charge the battery 24, power from the first component 44 can move along the first electrical transmission path from the connector 60, through the first cable 52, to the battery 24.

The first cable 52, the connector 60, and the second cable 56 provide portions of a second electrical transmission path. For example, power from the battery 24 moves through the first cable 52, to the connector 60, to the second cable 56, and then to the second component 48. If the second component 48 can charge the battery 24, power from the second component 48 can move along the second electrical transmission path through the second cable 56, through the connector 60, through the first cable 52, to the battery 24.

The example connector 60 provides a portion of a first electrical transmission path extending between the battery 24 and the first component 44. The connector 60 additionally provides a portion of a second electrical transmission path extending between traction battery 24 and the second component 48.

Examples of the first component 44 and the second component 48 include electric converters, such as DC-to-DC converters, chargers, heaters, and electrical air conditioning systems.

Figure 4:
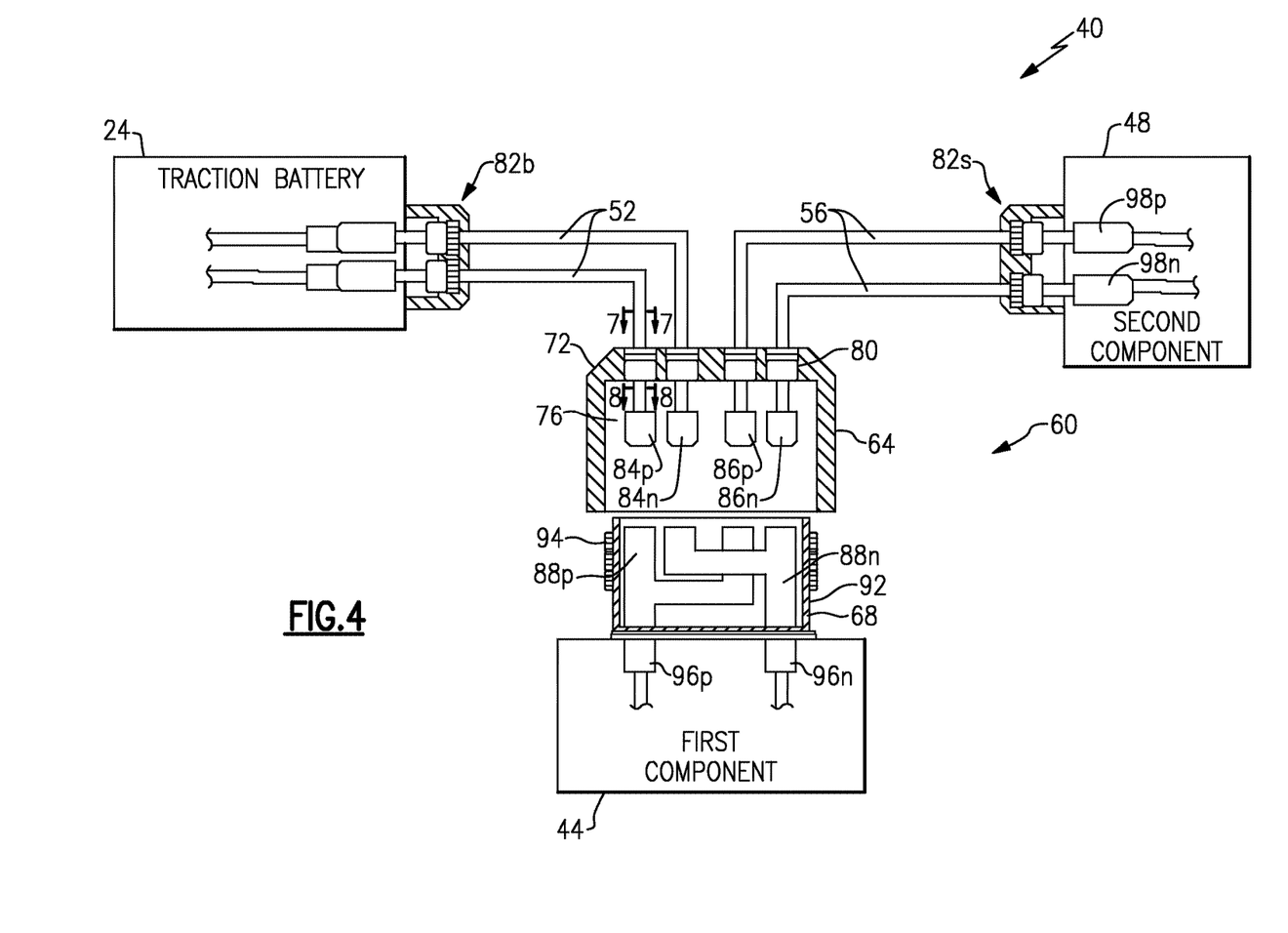
FIG. 4 illustrates a schematic view of a power splitting assembly from the power distribution system of FIG. 3 having a connector in a disengaged position.
Figure 5:
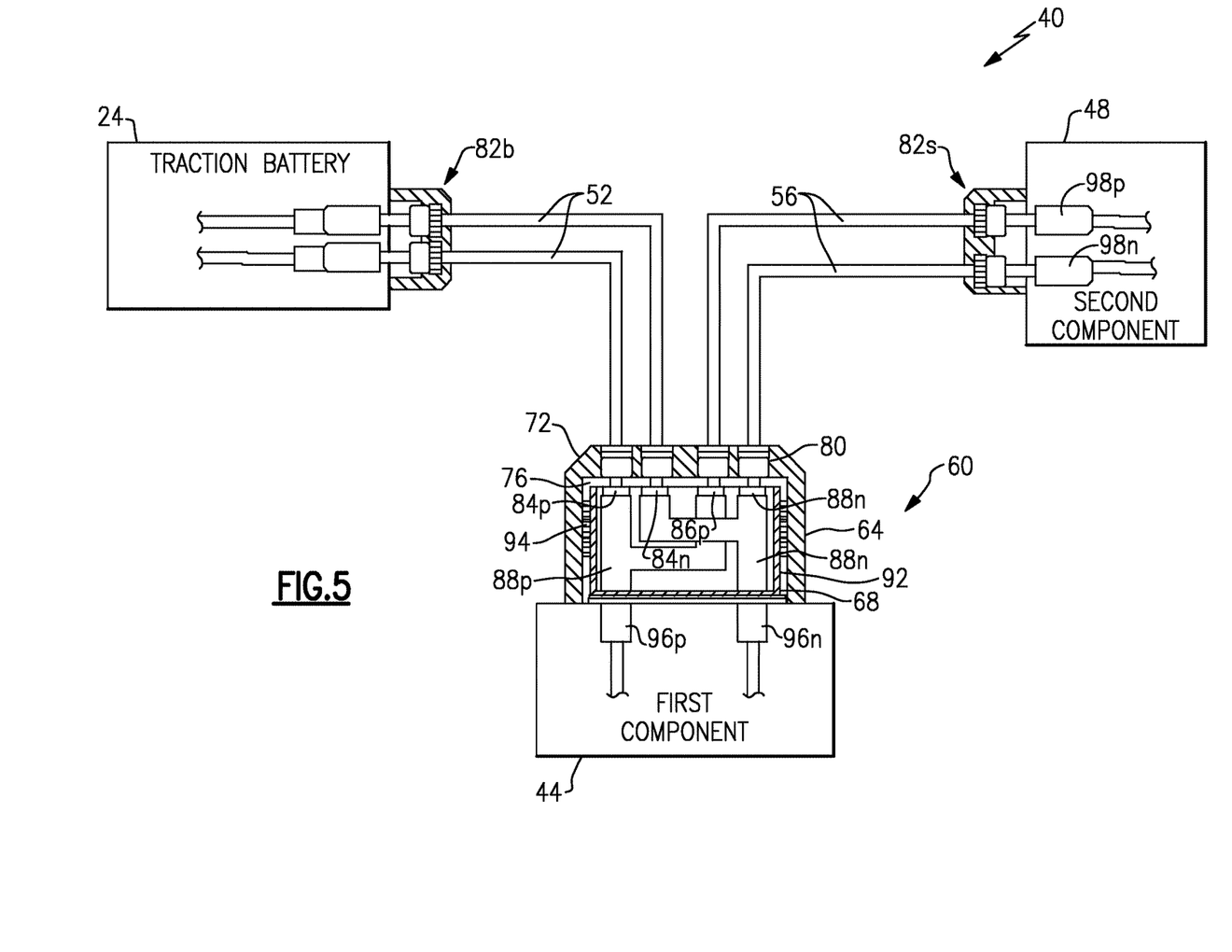
FIG. 5 illustrates a schematic view of the power splitting assembly from the power distribution system of FIG. 3 having the connector in an engaged position.
Figure 6:
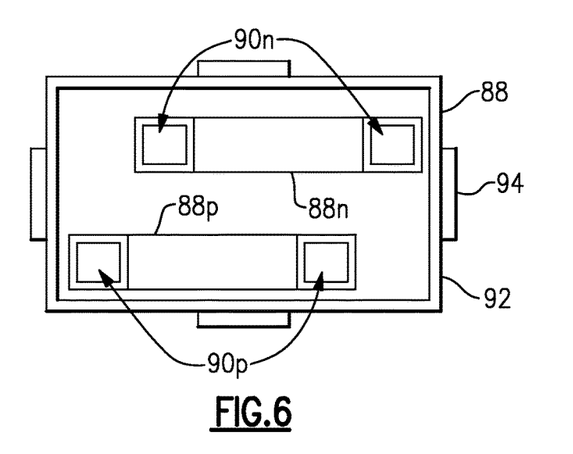
FIG. 6 illustrates an end view of a jack of the connector of FIG. 4.

Referring now to FIGS. 4-6, the example connector 60 includes a plug 64 and a jack 68. The plug 64 is selectively engageable with the jack 68.

When the plug 64 is disengaged from the jack 68 as shown in FIG. 4, the battery 24 is electrically decoupled from the first component 44 and the second component 48. When the plug 64 engages the jack 68 as shown in FIG. 5, the battery 24 is electrically coupled to the first component 44 and the second component 48.

The plug 64 includes a housing 72, a grounding plate 76, and at least one ground shield terminal 80. The ground shield terminals 80 grounds the electromagnetic interference (EMI) protective shield of the cable 52 or the EMI protective shield of the cable 56 to the grounding plate 76 within the housing 72.

In this example, two of the first cables 52 and two of the second cables 56 are directly connected to the plug 64. One of the ground shield terminals 80 is associated with each of the first cables 52 and each of the second cables 56.

The first cables 52 extend though an interface structure $82_b$ to electrically connect to the battery. The second cables 56 extend through an interface structure $82_s$ to electrically connect to the second component 48.

The first cables 52 terminate, within the housing 72, at a positive tab $84_p$ and a negative tab $84_n$, respectively. The second cables 56 terminate, within the housing 72, at a positive tab $86_p$ and a negative tab $86_n$, respectively.

The jack 68 includes a positive splitter $88_p$ and a negative splitter $88_n$ within a housing 92. When the plug 64 engages the jack 68, the tabs $84_p$ and $86_p$ are electrically connected to the positive splitter $88_p$. When the plug 64 engages the jack 68, the tabs $84_n$ and $86_n$ are electrically connected to the negative splitter $88_n$.

The example plug 64 electrically connects to the jack 68 with a male/female type connection. In this example, as shown in FIG. 6, the positive splitter $88_p$ includes apertures $90_p$ that engages or receives the tabs $84_p$ and $86_p$ when the plug 64 engages the jack 68. Also, the negative splitter $88_n$ includes apertures $90_n$ that engages or receives the tabs $84_n$ and $86_n$ when the plug 64 engages the jack 68. The apertures $90_p$ and $90_n$ are box shaped in this example.

In another example, the plug 64 includes the apertures that engage or receive tabs provided by the positive splitter $88_p$, the negative splitter $88_n$, or both. That is a tab on the plug 64 can be engaged or received within an aperture on the jack 68, or a tab on the jack 68 can be engaged or received within an aperture on the plug 64.

Techniques for electrically coupling the plug 64 and the jack 68 other than male female connections are possible and fall within the scope of this disclosure. The plug 64 could include tabs that directly contact tabs of the jack 68, for example, and are not received or engaged within an aperture.

Ribs 94 can extend from the jack 68 to engage the innerwardly facing walls of the plug 64. As the plug 64 is placed over the jack 68, the ribs 94 can bite into the walls of the plug 64 to help hold the plug 64 in an installed position with the jack 68. In another example, the plug 64 can include some or all of the ribs 94.

The jack 68 is directly secured to the first component 44 in this example. When the jack 68 is directly secured to the first component 44, the positive splitter $88_p$ and the negative splitter $88_n$ are electrically coupled to tabs $96_p$ and $96_n$ of the first component 44.

When the plug 64 engages the jack 68, the first electrical transmission path extends from the battery 24 through the cables 52, to the tabs $84_p$, $84_n$, to the splitters $88_p$ and $88_n$, and then to the first component 44 through the tabs $96_p$, $96_n$. When the tabs $96_p$ and $96_n$ receive power, the first component 44 is considered powered. The splitters $88_p$ and $88_n$ can be welded or crimped directly to the tabs $96_p$ and $96_n$ respectively, or to cables of the component 44.

When the plug 64 engages the jack 68, the second electrical transmission path extends from the battery 24 through the cables 52 to the tabs $84_p$, $84_n$, to the splitters $88_p$ and $88_n$, through the tabs $86_p$, $86_n$ and then through the cable 56 to tabs $98_p$ and $98_n$ of the second component 48.

The connector 60 thus provides portions of both the first electrical transmission path and the second electrical transmission path.

In one specific embodiment, the first component 44 is an electrical air conditioning system and the second component 48 is a positive temperature coefficient (PTC) heater. In such an example, the heater, using relatively high voltage DC, can add thermal energy to a cooling circuit so that a passenger compartment of the vehicle 20 can be heated.

In another example embodiment, the first component 44 is a DC-to-DC converter and the second component 48 is a charger.

In another embodiment, the first component 44 is a DC-to-DC converter and the second component 48 is an electrical air conditioning system, and specifically a compressor of this system. For such the embodiment, the expected ambient temperature from the battery to the converter is about 90 degrees Celsius and the running current can be 48 amps or less. The expected ambient temperature from the converter to the electrical air conditioning system is about 105 degrees Celsius and the running current may drop to 26 amps or less. The first cable 52 and the second cable 56 can have a 5 mm$^2$ conductor cross-section to support electrical transmission in such an environment. Also, the splitters $88p$ and $88n$ can have a cross-section from 5 to 6 mm$^2$ to support electrical transmission in such an environment.

Figure 7:
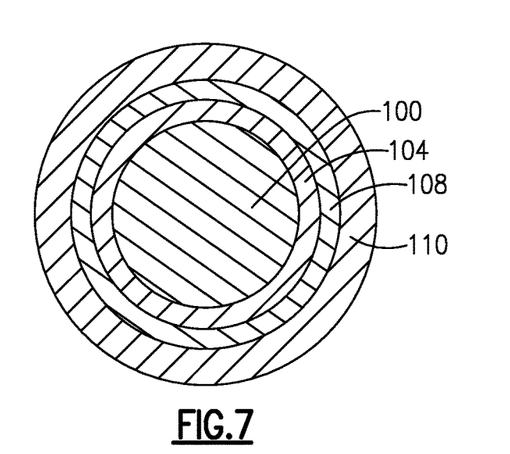
FIG. 7 illustrates a cross-section view at line 7-7 in FIG. 4.
Figure 8:
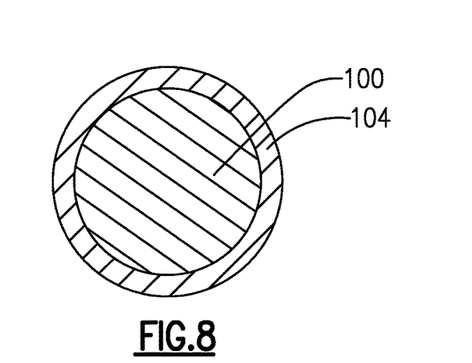
FIG. 8 illustrates a cross-section view at line 8-8 in FIG. 4.

Referring now to FIGS. 7 and 8, the example cables 52 include a conductive core 100, an inner shield 104, a mesh shield 108, and an outer shield 110. In this example, the inner shield 104 and the outer shield 110 are a polymer material, the conductive core 100 is copper, and the mesh shield 108 is metallic.

When the first cables 52 and second cables 56 are secured to a respective one of the ground shield terminals 80 (FIG. 4), the ground shield terminals 80 bites through the outer shield 110 to directly electrically connect to the mesh shield 108. The portions of the first cables 52 and second cables 56 extending from the ground shield terminals 80 to the respective tab $84_p$, $84_n$, $86_p$, or $86_n$ does not include the outer shield 110 or the mesh 108 in this examples.

Electrically connecting the ground shield terminal 80, which is grounded to the grounding plate 76, to the mesh 108 ground the cables 52 and 56 to protects against electromagnetic interference. The grounding plate 76 grounds to a chassis of the vehicle 20 through the first component 44 in this example.

Figure 9:
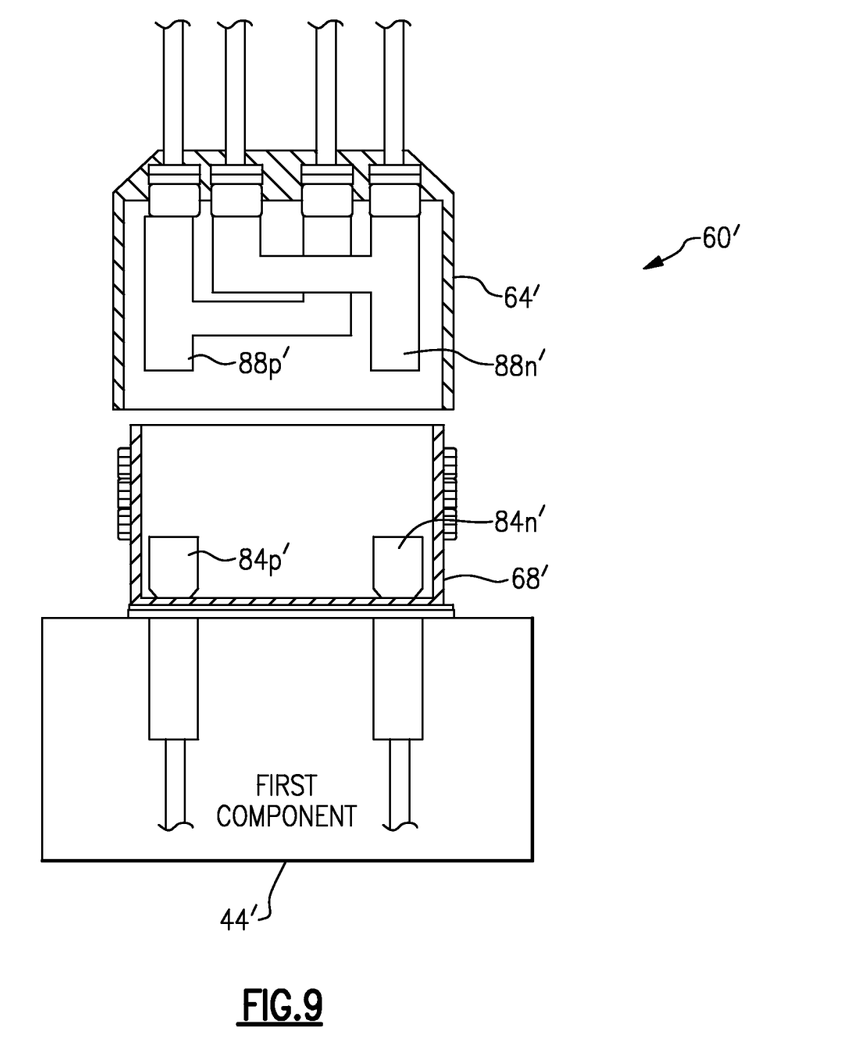
FIG. 9 illustrates a schematic view of a power splitting assembly according to another exemplary embodiment.

Referring now to FIG. 9, another example connector 60' houses splitters $88_p'$ and $88_n'$ within a plug 64' rather than a jack 68'. Tabs $84_p'$ and $84_n'$ electrically connect to the splitters $88_p'$ and $88_n'$ when the plug 64' engages the jack 68'. The tabs $84_p'$ and $84_n'$ are in electrical communication with a first component 44'. The tabs $84_p'$ and $84_n'$ can be apertures, such as apertures have a box-type cross-section in another example.

Figure 10:
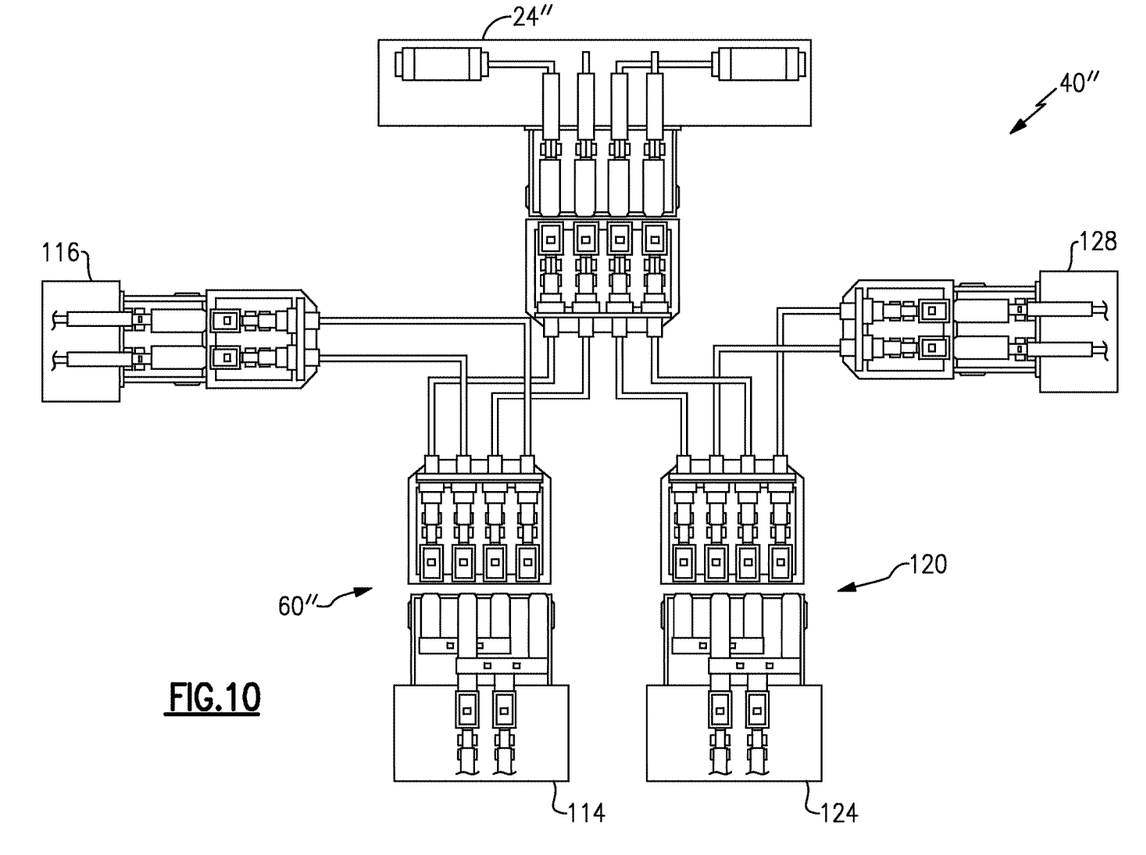
FIG. 10 illustrates a schematic view of another example power distribution system.

Referring to FIG. 10, an example power distribution system 40" is used within a plug-in hybrid vehicle. The system 40" can include a first connector 60" helping to transmit power from a battery 24" to a PTC heater 114 and an electric air conditioning compressor 116. The system 40" further includes a second connector 120 helping to transmit power from the battery 24" to a DC-to-DC converter 124 and a charger 128.

The first connector 60" is directly connected to the PTC heater 114. The second connector 120 is directly connected to the DC-to-DC converter 124. The cables of the system 40" can have a cross-sectional area that is 3 mm$^2$.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A power splitting assembly for an electrified vehicle, comprising:
a connector having a splitter that provides at least a portion of a first path and at least a portion of a second path, the first path to transmit power between a traction battery and a first component, the second path to transmit power between the traction battery and a second component, the connector directly connected to at least one first cable extending from the traction battery and to at least one second cable extending from the second component.

2. The assembly of claim 1, wherein the connector comprises a plug and a jack, the at least one first and the at least one second cable both directly connected to the plug, the plug selectively moveable back and forth between and an engaged position with the jack and a disengaged position with the jack.

3. The assembly of claim 2, wherein the jack is directly secured to the first component, wherein the splitter is housed within the plug, the first path interrupted when the plug is in the disengaged position such that power is prevented from transmitting along the first path from the traction battery to the first component, the second path uninterrupted when the plug is in the engaged position and when the plug is in the disengaged position.

4. The assembly of claim 2, wherein the splitter is a positive splitter providing a portion of both the first path and the second path, and the connector further comprises a negative splitter providing a portion of both the first path and the second path.

5. The assembly of claim 4, wherein at least one of the positive splitter or the negative splitter is contained within the jack.

6. The assembly of claim 4, wherein at least one of the positive splitter or the negative splitter is contained within the plug when the plug is in the disengaged position.

7. The assembly of claim 2, wherein the splitter is housed within the jack, both the first and second paths interrupted when the plug is in the disengaged position such that power is prevented from transmitting along the first path from the traction battery to the first component and along the second path from the traction battery to the second component, the first and second paths uninterrupted when the plug is in the engaged position.

8. The assembly of claim 1, wherein the first and second cable extend through a common surface of the connector.

9. The assembly of claim 1, wherein the connector is a single connector comprising a single plug and a single jack.

10. A power distribution system for an electrified vehicle, comprising:
 a traction battery;
 a first component;
 a second component; and
 a connector having a plug, a jack, and splitter, the splitter providing at least a portion of a first electrical transmission path extending between the traction battery and the first component, and further providing at least a portion of a second electrical transmission path extending between the traction battery and the second component,
 the plug directly connected to at least one first cable extending from the traction battery and to at least one second cable extending from the second component.

11. The system of claim 10, wherein the connector is directly connected to the first component or the second component.

12. The system of claim 10, wherein the first component is electric air conditioner for the electrified vehicle.

13. The system of claim 10, wherein the first component is a heater.

14. The system of claim 10, wherein the first component is a charger.

15. The system of claim 10, wherein the connector comprises no more than one plug and no more than one jack.

16. A method of transmitting power within an electrified vehicle, comprising:
 transmitting power along a first electrical transmission path extending from a traction battery, to a plug of a connector, and then through a splitter of the connector to a first component; and
 transmitting power along a second electrical transmission path extending through the splitter, and then from the plug to a second component,
 the plug selectively engageable with a jack of the connector.

17. The method of claim 16, wherein the power is equal or greater than 60 volts.

18. The method of claim 16, wherein the jack is directly attached to the first component.

19. The method of claim 16, further comprising transmitting power from the traction battery to the connector using at least one first cable, and transmitting power from the connector to the second component using at least one second cable, the at least one first cable and the at least one second cable connected to a common surface of the plug.

20. The method of claim 16, wherein the plug is directly connected to at least one first cable extending from the traction battery and to at least one second cable extending from the second component.

* * * * *